Dec. 12, 1933.   G. C. HUPPERTZ   1,938,628
AUTOMATIC WATER SOFTENER
Filed May 20, 1931   3 Sheets-Sheet 1

Inventor:
George C. Huppertz,
By Wilkinson, Huxley, Byron + Knight
Attys

Dec. 12, 1933.    G. C. HUPPERTZ    1,938,628
AUTOMATIC WATER SOFTENER
Filed May 20, 1931    3 Sheets-Sheet 2

Inventor:
George C. Huppertz,
By Wilkinson, Huxley, Byron & Knight

Dec. 12, 1933.      G. C. HUPPERTZ      1,938,628
AUTOMATIC WATER SOFTENER
Filed May 20, 1931       3 Sheets-Sheet 3

Inventor:
George C. Huppertz,
By Wilkinson, Huxley, Byron & Knight
Attys

Patented Dec. 12, 1933

1,938,628

UNITED STATES PATENT OFFICE 1,938,628

AUTOMATIC WATER SOFTENER

George C. Huppertz, St. Charles, Ill.

Application May 20, 1931. Serial No. 538,697

8 Claims. (Cl. 210—24)

This invention relates to water softeners including regeneration control apparatus, and in some of its aspects broadly to timed valve control apparatus. The valve timing apparatus of this invention has been shown in combination with softening apparatus comprising a mineral softening tank and a tank of brine for regenerating the mineral softener together with one four-way and one three-way valve for effecting either softening or regenerating. The timing and valve apparatus illustrated includes a pivoted disk having pegs thereon adapted to co-act with special valve levers for turning the same and means for causing the disk to rotate at a slow uniform speed upon the touch of an electric button and to stop automatically its rotation at the completion of one revolution. The disk has been shown as carrying one peg passing on one side of the valves to turn them in one direction and a second peg passing on the other side of the valves to turn them back. Cam surfaces are provided on the disk for preliminarily unseating the valve in case it should be stuck.

Numerous objects are accomplished by this invention. Means are provided for correctly controlling the regenerating process upon the press of an electric button and terminating the process after the lapse of a predetermined time. In the mean time, first one valve and then another has been turned to shut off the softening outlet from the house supply, connect the mineral tank to the drain, connect the water supply through the brine tank to the mineral tank, then cut off the brine tank to permit washing of the brine from the mineral tank and finally turning the valves to the original position for softening. In spite of the number of operations necessary the apparatus has been reduced to extreme simplicity and dependability. The only timing device is an ordinary electric motor and gearing, and the simple operating device, which operate at constant speed during the entire process, thus avoiding troublesome solenoids, flow meters, diaphragms, and other special timing devices. At the same time the invention satisfactorily avoids the necessity and inconvenience of carefully measuring the salt or timing the operations, and the exact timing results in great economies. Means have also been provided for indicating when it is necessary to add salt to the brine tank after the performance of a predetermined number of regenerations. In the broader aspect of the invention this same simple means is provided for operating any valves according to any predetermined program. All danger of trouble due to sticking valves has been eliminated.

With these and various other objects in view, the invention may consist of certain novel features of construction and operation, as will be more fully described and particularly pointed out in the specification, drawings and claims appended hereto.

In the drawings, which illustrate an embodiment of the device, and wherein like reference characters are used to designate like parts, Figure 1 is a view illustrating the softening apparatus showing the relation of the valve operating apparatus to the valves;

Figure 1:
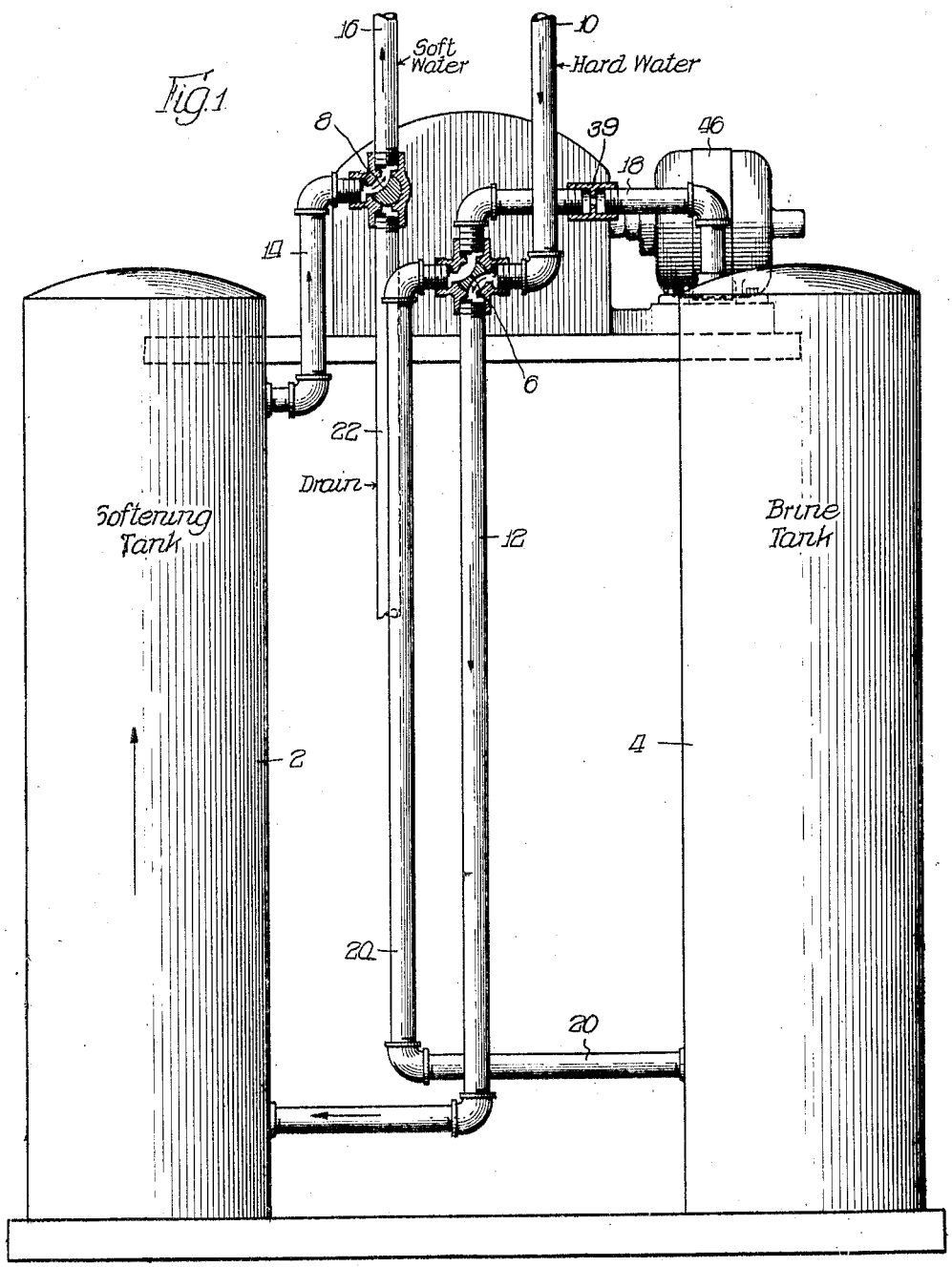
Figure 2:
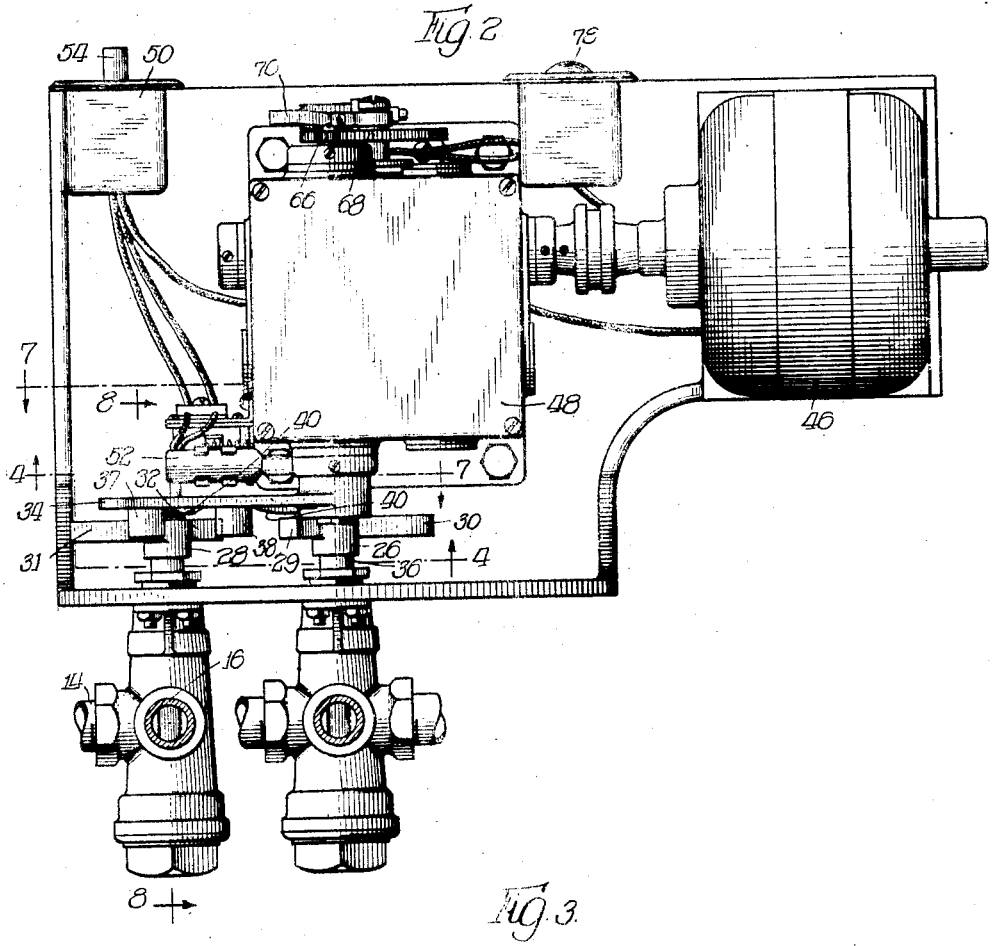
Figure 2 is a plan view of the valve control apparatus.

Although this invention may take many forms, only one has been chosen for illustration. This has been illustrated in connection with a common mineral type of water softener illustrated in Figure 1. The softening apparatus includes a mineral softening tank 2, a brine tank 4, a valve system which may comprise one valve, or as shown, an inlet valve 6, and an outlet valve 8 with suitable housings and connecting pipes. During the softening process, hard water flows into the system through source pipe 10, is directed by the valve 6 into the pipe 12 from which it flows into the tank 2, as indicated by the arrows. In the tank 2 the water flows in contact with usual minerals by which it is softened and out through pipe 14 from which it is directed by the valve 8 to the soft water supply pipe 16 for use.

During the regenerating process both the valves 6 and 8 are turned 90° to the left to what may be called the brining position of the valve system. The water then is directed by valve 6 from source pipe 10 to the pipe 18 to the top of the brine tank 4. From the bottom of the brine tank the brine flows through pipes 20 and is directed by the valve 6 into pipe 12 from which it flows into the softening tank, then through it in contact with the minerals to clean or regenerate them, and finally out through the pipe 14 from which it is directed by valve 8 through the drain pipe 22.

For the rinsing step, the valve 6 is then turned back to its original position so that the brine tank is cut off and hard water is directed by the valve 6 from the source pipe 10 directly to the pipe 12 and the softening tank 2. In order to thoroughly rinse the minerals and remove all traces of the brine, this rinsing process continues until after the lapse of a predetermined time known to be sufficient for complete washing, the water leaving the softening tank 2 by the pipe 14 being directed by the valve 8 into the drain. The valve 8 is then turned back to its original position and the softened water is supplied into the soft supply pipe 16 to be used.

Figure 4:
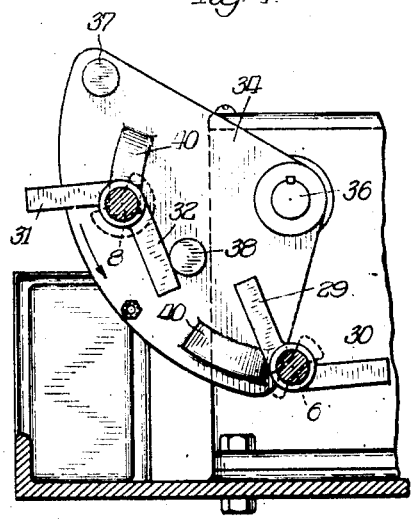
Figures 4, 5 and 6 are views taken through the line 4—4 of Figure 2 illustrating the position of the parts when the valves are in their first, second and third positions, respectively.
Figure 7:
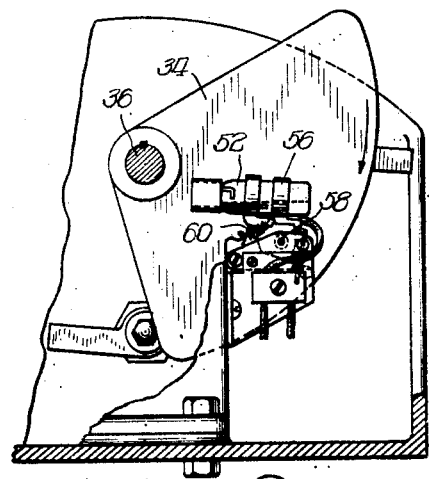
Figure 7 is a sectional view taken through the line 7—7 of Figure 2, showing especially the terminating switch.
Figure 5:
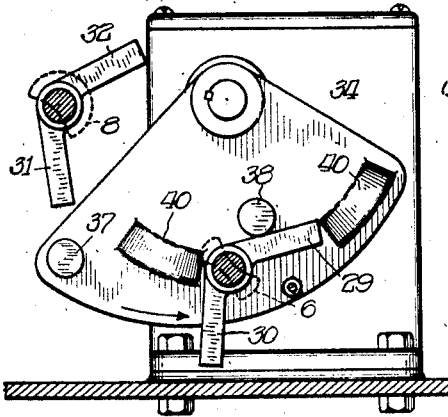
Figure 6:
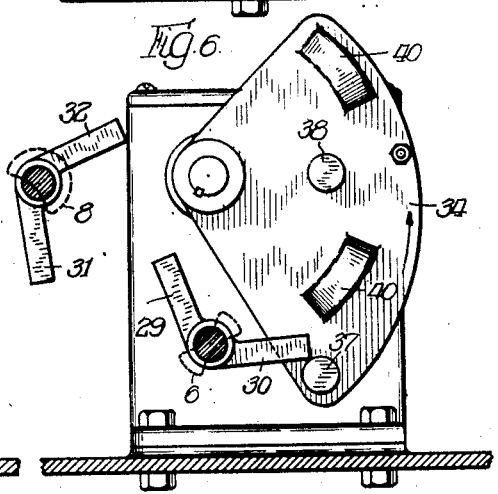

According to the present invention, valves 6 and 8 are operated automatically in the proper time relation. In the form shown, the usual manual valve handles are replaced by the two-armed levers 26 on the valve 6 and 28 on the valve 8. For convenience the arms on the lever 26 may be designed brine opening arm 29, and the brine closing arm 30; and the arms of the lever 28 may be designated the drain opening arm 31 and the drain closing arm 32. An operating disk 34 is mounted on and turned by a suitable shaft 36. The disk 34 carries the pegs 37 and 38 which are spaced substantially as shown so that the peg 38 passes to one side of the valves 6 and 8 while the peg 37 passes to the other side during the softening process. As the disk 34 is stationary the pegs and valves are in the position shown in Figure 4 in which the peg 38 has just turned the valve 8 by its drain closing arm 32. As the disk is rotated by apparatus to be described later, the peg 37 comes into contact with the drain opening arm 31 and turns the valve 8 thereby. During the turning of valve 8, peg 38 comes into contact with the brine opening arm 29 to turn the valve 6 to the position shown in dotted lines in Figure 5. The apparatus is then in its second stage, during which brine flows into the softening tank 2 and out through the drain. As the disk 34 continues to rotate the peg 37 comes into contact with brine closing arm 30 of valve 6 and operates it to shut off the brine and turn the hard water directly into the softening tank. The valves and operating disk are shown in this third step in Figure 6. As the operating disk 34 continues to rotate and after a considerable period, the peg 38 again comes in contact with drain closing arm 32 of valve 8 and thereby closes the drain and connects the water softening apparatus for use, returning the valves to the original position shown in Figure 4. At this point the operating disk is automatically stopped in a manner to be described.

The amount of water or brine that should flow during the brining period (second stage) is only a very small fraction of the amount of water which should flow during the rinsing period. To avoid making the apparatus so delicate or large that the valves would remain in the respective positions the proper proportionate times, a restriction 39 is placed in pipe 18 or elsewhere as may be suitable. This restriction may permit the valves to be in the brining position five minutes or more without unnecessary waste of brine. In this manner all the difficulties of having one valve open an almost negligible length of time compared with the other, are avoided. By varying the restriction, compensation may be made for unusually high or low water pressure, though the small aperture is less affected by the small variations in pressure than the unrestricted pipe would be.

The slow flow of brine is advantageous aside from the valve control difficulties as it results in a more efficient use of the brine. The saturated solution of brine spreads more uniformly across the mineral tank, is diluted by the remaining water to a more efficient mixture, and at the same time is allowed more time for contact with the mineral so that less brine is washed through unused. If desired, an extra valve position could be arranged in which all flow would be stopped to permit soaking.

Figure 8:
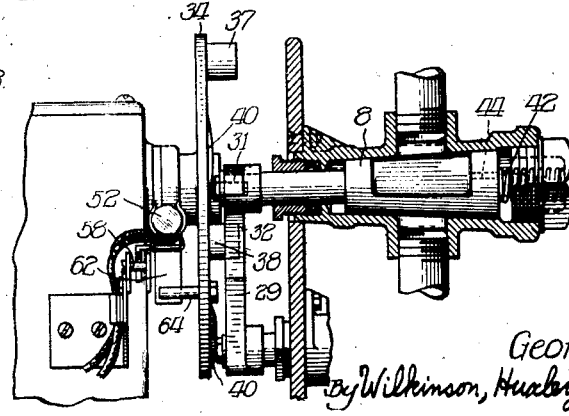
Figure 8 is a sectional view taken along the line 8—8 of Figure 2, illustrating the construction of the valve and showing the valve loosening means.

It sometimes occurs that a water softener is not regenerated for a period of many months and in such cases the valves may be stuck and very hard to operate. To overcome this difficulty cam surfaces 40 are provided on the operating disks 34 in line with the stems of valves 6 and 8. As the valve operating disk is rotated and before the pegs come in contact with the valves the cams 38 co-act with the valve stems to press the valves outwardly or to the right as shown in Figure 8, and unseat the valves so that they may be easily turned over. The valves are preferably of the type illustrated, of conical shape, pressed inwardly by a spring 42 and provided with a passage 44 for admitting the water pressure to the outside end of the valve core to aid in pressing it inward. It is preferred that the cams be spaced slightly differently from the spacing of the valves so that the resistance of only one valve will be effective at any given time.

An electric motor 46 is provided together with a suitable gear box 48 for turning the shaft 36 and operating disk 34 at low speed. The gear box 48 may of course include any suitable arrangement of gears, such as three successive worm gears, which will reduce the high speed of the motor to a speed which is suitable for the purpose. In one construction a ratio of about 36,000 to 1 has been found satisfactory, which, with the particular motor used, provided a twenty minute cycle for the operating disk. Such low gearing has the advantage that even though a comparatively small motor be used, the force which may be exerted on the valves is enormous.

The motor 46 is controlled through suitable wiring by a momentary hand switch 50 and a mercury or other suitable automatic switch 52. The hand switch 50 is of a type which is only effective to close the circuit, while its button 54 is being pressed. It is therefore necessary that the mercury switch complete the motor circuit soon after the hand switch is pressed and maintain the circuit during the entire cycle, breaking it at the end of the cycle. For this purpose the mercury switch 52 is mounted on a suitable cradle 56 and is pivoted on the suitable pin 58. A spring 60 gives the cradle a normal bias to the circuit closing position. The cradle is provided with a trip lever 62 which is pressed by a pin 64 on the back of the operating disk 34. As the operating disk 34 completes its cycle and turns the valve 8 back to its initial position the pin 64 meets the trip lever 62 and tilts the cradle 56 about the pivot 58 so that the mercury in the mercury switch 52 flows away from the contacts, thereby opening the motor circuit. The apparatus then remains stationary until the button 54 of the hand switch 50 is pressed, thereby temporarily closing the motor circuit. Of course the regeneration could be started by a flow meter or by other automatic means. Within a few seconds the operating disc 34 is rotated so that the pin 64 is carried beyond the trip lever 62 of the mercury switch so that the latter is drawn back to its circuit closing position by the spring 60. The hand switch will then be released as the circuit will continue to be closed throughout the cycle by the mercury switch 52.

Figure 3:
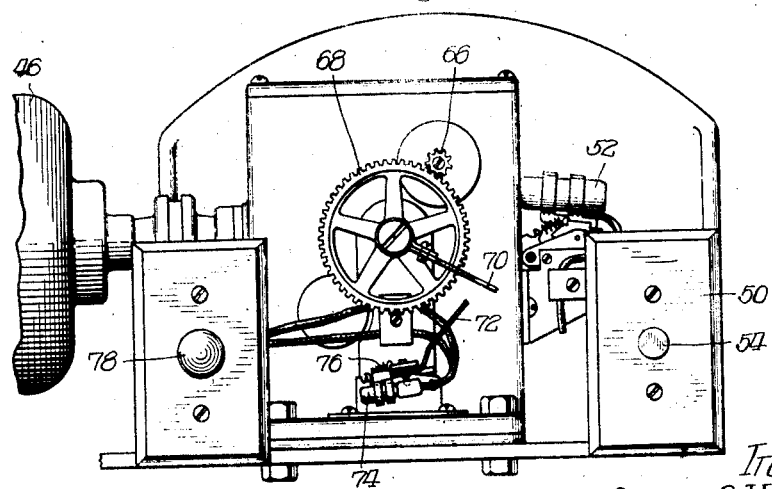
Figure 3 is a rear view of the latter showing also the exact indicating apparatus.

It is desirable though not necessary that means be provided for indicating when the salt should be added to the brine tank. For this purpose a pinion 66 is mounted on the shaft 36 and a larger gear 68 is freely pivoted to mesh therewith. The gear 68 carries a prong 70 which is arranged to strike a trip lever 72 of a second pivoted mercury switch 74. This mercury switch 74 is provided with a spring 76 which normally tends to tilt the mercury switch to a circuit breaking position. As the gear 68 rotates in a counter-clockwise direction as seen in Figure 3, the prong 70 will come in contact with the upper side of the extension 72 and tilt the mercury switch 74 to cause such switch to close the circuit of the connected wires. This circuit is the illuminating circuit for an indication lamp 78. Both of the mercury switches could be otherwise operated, as by a notched disk.

Obviously both the switch 50 and the lamp 78 may be located remote from the apparatus, as for example in the kitchen or bathroom, it merely being necessary to run suitable wires to them. As a matter of fact, three wires may be sufficient as one wire can be jointly used for the switch and the lamp.

A control device such as this could be constructed to operate any number of valves according to any schedule, the pegs being located on both sides of the disk and at many different distances from the center of rotation if necessary. By providing three or four arms, the valve can be turned always in the same direction, if the pegs are located to all pass on one side. The radial spacing of the pegs and the shape of the arms can be varied to cause any desired degree of rotation of the valves.

It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit. Such terms as "brine" are used as a matter of convenience only since the invention could be used equally well with many different materials.

What is claimed is:

1. In combination, a valve having a part movable with respect to the rest of the valve, an automatic valve operating mechanism including means for releasing said movable part if it has become stuck independently of operating said valve.

2. The combination of a pair of valves, a member rotatable at a point equidistant from said valves, means for constantly rotating said member, pegs on said member spaced unequally from the axis of rotation of said member at such distances as to pass on opposite sides of said valves and a pair of levers on each of said valves each of which is arranged to be engaged by one of said pegs and to turn the valve a predetermined amount upon the passage of said peg.

3. The combination of a pair of valves, a member rotatable at a point equidistant from said valves, means for constantly rotating said member, pegs on said member spaced unequally from the axis of rotation of said member at such distances as to pass on opposite sides of said valves and a pair of levers on each of said valves, each of which is arranged to be engaged by one of said pegs and to turn the valve approximately ninety degrees upon the passage of said peg.

4. The combination with a valve, a conical core and a conical seat, and means tending to press said valve against said seat, of control means for said valve adapted to be operated after lapses of considerable time, said control means including means for unseating said valve and additional means for turning said valve.

5. The combination with a valve having a conical core, a conical seat, and means tending to press said core against said seat, of control means for said valve adapted to be operated after lapses of considerable time, said control means comprising a rotatable disk having cam surfaces thereon for unseating said valve and having pegs thereon for turning said valve and means for rotating said disk.

6. Water softening apparatus of the regenerative type including a valve system having a softening position, a brining position and a rinsing position, control means for operating said valve system to said three positions according to a given schedule, means for automatically stopping the operation of said control means each time that the valve system is operated to the softening position, manual means for starting the operation of said control means, and means included in said control means for releasing said valves before operating them in case they have become stuck.

7. Water softening apparatus of the regenerative type including a valve system, means for controlling said valve system in a given cycle and according to a given schedule, manual means for setting said control means in operation, automatic means for stopping said control means at the end of a cycle, and means for automatically indicating whenever said valve system has been operated through said cycle a given number of times.

8. The combination of a valve having a conical core, a conical seat, and means tending to press said core against said seat; valve operating means for rotating said core, and valve release means for unseating said valve just prior to the rotation of said core by said valve operating means.

GEORGE C. HUPPERTZ.